United States Patent Office 3,527,667
Patented Sept. 8, 1970

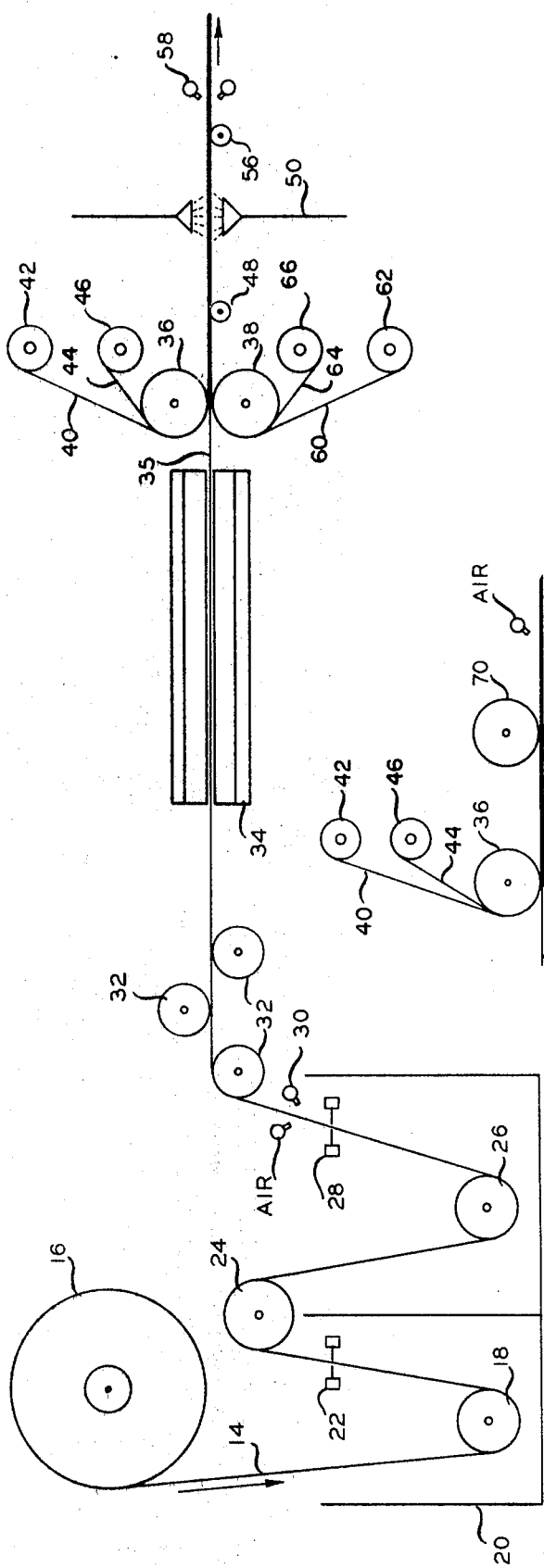
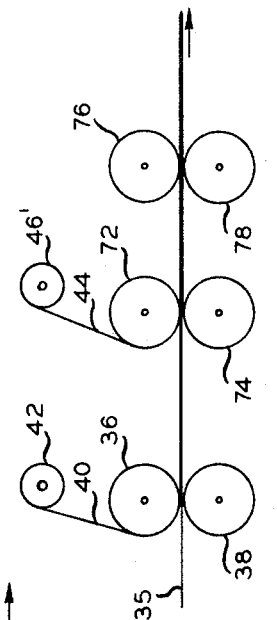
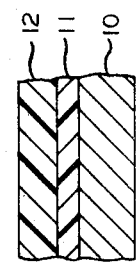
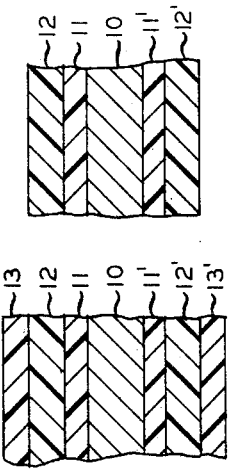
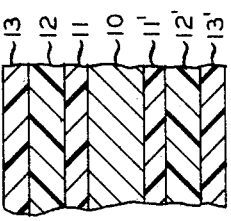

3,527,667
ANTI-OXIDANT FREE 1-OLEFIN COATED METAL SUBSTRATE AND METHOD FOR COATING SAME
Olaf E. Larsen and Robert H. Griffin, Bartlesville, Okla., assignors to Phillips Petroleum Company, a corporation of Delaware
Filed Jan. 2, 1962, Ser. No. 163,525
Int. Cl. B32b 15/08, 27/08; C09j 5/02
U.S. Cl. 161—216
18 Claims

ABSTRACT OF THE DISCLOSURE

A metal structure is heated to a temperature within the range of about 450 to about 520° F. An unsoftened essentially anti-oxidant free normally solid polymer of a 1-olefin is then applied to the heated structure to deposit thereon a layer of polymer softened by the heat contained in said metal structure. The resulting coated structure is then cooled.

---

This invention relates to a structure coated with a polymer of a 1-olefin. In one aspect this invention relates to a process for coating structures with a polymer of a 1-olefin.

Polymers of 1-olefins, e.g., polyethylene, are well known for their resistance to most chemical compounds including acids, bases, salts, etc. and have been used to form protective coatings on metal and other surfaces to render said surfaces corrosion resistant. Said polymers also have excellent electrical insulating properties and can be used for forming insulating layers on materials provided voids in the insulation can be avoided. The use of said polymers for protective coatings and insulation purposes has been hampered, in many instances, by the lack of satisfactory coating methods. It is difficult, and in some instances impossible, to obtain a satisfactory bond between the polymer and the metal or other material without resorting to special treatments of the surface to be coated such as an etching or mechanical roughening thereof. Some processes for coating metals and other base materials with said polymers comprise first applying an intermediate coating of another resin, e.g., those of the polyvinyl acetal group, as an adhesive or intermediate layer which bonds to the metal or other base material and the polymer is then bonded to said intermediate layer. Other methods involve the addition of special materials to the polymer to increase its adhesive properties.

We have now discovered that the reason for the difficulty in forming strong bonds between said polymers of a 1-olefin, e.g., polyethylene, and the material to be coated, is the presence in the polymer of the anti-oxidant material which is customarily added to those polymers during their manufacture. We have found that good strong bonds between metal and other base materials and polymers of 1-olefins can be readily obtained without the necessity of special surface treatments on the base material, or without the use of an intermediate or added adhesive material, by using an essentially anti-oxidant free polymer as the primary coating material.

Thus, broadly speaking, the present invention resides in a coated structure, and a method for coating said structure, employing as the primary coating material an essentially anti-oxidant free polymer of a 1-olefin (defined further hereinafter).

An object of this invention is to provide a structure coated with a polymer of a 1-olefin. Another object of this invention is to provide a laminated article or structure coated with a polymer of a 1-olefin. Another object of this invention is to provide a method of coating structures of base material with a polymer of a 1-olefin. Another object of this invention is to provide a laminated coated structure comprising a first or primary layer of an essentially anti-oxidant free polymer of a 1-olefin bonded to a base material and one or more successive layers on an environment resistant polymer bonded to said first layer. Still another object of this invention is to provide a method of forming a laminated coated structure comprising first bonding to said structure of base material a primary or first layer of an essentially anti-oxidant free polymer and then bonding a second layer of an environment resistant polymer to said first layer of essentially anti-oxidant free polymer. Other aspects, objects, and advantages of the invention will be apparent to those skilled in the art in view of this disclosure.

Thus, according to the invention, there is provided a laminated structure comprising a layer of base material and a contiguous layer of an anti-oxidant free polymer of a 1-olefin containing from 2 to 4 carbon atoms per molecule bonded to said base material.

Further according to the invention, there is provided a method for applying a coating of a polymer of a 1-olefin containing from 2 to 4 carbon atoms per molecule to a base material, which method comprises: preheating said base material to a temperature within the range of 450 to 520° F.; contacting said heated base material with an essentially anti-oxidant free polymer of said 1-olefin to deposit thereon a layer of softened polymer; and thereafter cooling the resulting coated base material.

As mentioned above, ordinary commercial polymers of 1-olefins, e.g., polyethylene, contain an appreciable amount (up to 0.2 weight percent or more) of an anti-oxidant material such as 4,4' - thiobis - (6-tert-butyl-m-cresol) (Santanox), or 2,6-di-tert-butyl-4-methyl phenol (Ionol). However, it will be noted that the polymer of a 1-olefin applied to the base material as the primary or first layer in the practice of this invention is an essentially anti-oxidant free polymer. We have found that the polymer of a 1-olefin must be essentially anti-oxidant free if one is to obtain a well-bonded, strongly adhering coating. Otherwise, there is obtained a loosely bonded coating which, while providing temporary protection, does not afford protection for the period of time desired in most instances except where temporary peelable coatings are desired.

Thus, herein and in the claims, unless otherwise specified, the term "essentially anti-oxidant free polymer" refers to a polymer of a 1-olefin having from 2 to 4 carbon atoms per molecule and containing from 0 to not more than 0.02 weight percent of an anti-oxidant agent, such as those name above.

The preferred plastic pdlymer materials suitable for use in the practice of the invention are the normally solid polymers of aliphatic 1-olefins having a density in the range of 0.940 to 0.980, preferably 0.949 to 0.963, gram per cubic centimeter, and a molecular weight in the range of about 35,000 to 250,000. As employed herein and in the claims, unless otherwise specified, the term "polymer" includes homopolymers of said 1-olefins, copolymers of one of said 1-olefins with another of said 1-olefins as a comonomer, blends of said homopolymers, blends of said copolymers, blends of a homopolymer and a copolymer, and blends of at least one of said homopolymers or said copolymers with normally solid polyisobutylene. The 1-olefins having from 2 to 4 carbon atoms per molecule are used for preparing the plastic polymer materials employed in the practice of the invention. Methods for preparing said normally solid polymers of said 1-olefins are well known to those skilled in the art. A preferred method for preparing said normally solid polymers of 1-olefins is that described and claimed in U.S. Pat. 2,825,721 issued Mar. 4, 1958 to J. P. Hogan et al. Polymers prepared in accordance with the method of said patent are known as linear polymers and are available commercially under the trademark Marlex.

A presently preferred plastic polymer material for use in the practice of the invention is a polymer of ethylene prepared in accordance with the method of said patent and having a density of at least 0.940 gram per cc. at 73–78° F., and a molecular weight of at least 35,000. This classification includes, in addition to homopolymers of ethylene, copolymers of ethylene with higher monoolefins, e.g., propylene and 1-butene, the higher comonomer generally being incorporated into the copolymer molecule in small proportions as compared with the ethylene monomer. Any desired amount of said comonomer can be utilized to form said copolymer so long as the density of the resulting copolymer is at least 0.940 gram per cc. This classification also includes, in addition to said homopolymers of ethylene and said copolymers of ethylene with said comonomers, blends of said copolymers with a normally solid polyisobutylene having a molecular weight within the range of 80,000 to 200,000, preferably 120,000 to 160,00. Preferably, the polymers of ethylene according to this classification which are utilized in the practice of the invention will have a density in the range of about 0.949 to 0.963 gram per cc. and a molecular weight in the range of about 35,000 to about 250,000. Such polymers of ethylene are known in the art as "high density" polyethylenes.

The copolymers of ethylene with a higher monoolefin which are applicable for use in the practice of the invention are those containing ethylene and at least one higher olefin such as propylene and 1-butene. An example of such a copolymer suitable for use in the practice of the invention is a copolymer of ethylene with 1-butene having a density within the range of from 0.946 to 0.954 gram per cc. Copolymers of ethylene with 1-butene having from 1 to 10, preferably 1.5 to 5, more preferably 1 to 3 weight percent of the 1-butene comonomer incorporated into the copolymer molecule can be utilized in the practice of the invention. Preferably, the density of the copolymer is approximately 0.949 to 0.951 and the melt index is approximately 0.3. Copolymers of this type are preferably prepared by the copolymerization of a major amount of ethylene and a minor amount of 1-butene in the presence of a catalyst consisting essentially of chromium oxide supported on a silica-aluminum composite, the catalyst containing at least 0.1 weight percent chromium in the hexavalent state. The total chromium content of the catalyst is generally, though not necessarily, within the range of 1 to 10 weight percent of the total catalyst. The copolymerization is frequently carried out at a temperature within the range of from about 230 to about 300° F. Ordinarily, the copolymerization is conducted in the presence of a hydrocarbon diluent which is liquid and inert under the reaction conditions. Generally, this diluent is a naphthalene or a paraffin hydrocarbon having from 3 to 12 carbon atoms per molecule. Examples of such hydrocarbons are normal pentane, normal hexane, 2,2,4-trimethylpentane, cyclohexane and methylcyclopentane. The catalyst is preferably used as a granular suspension thereof in the diluent. Further details of this process can be obtained by a reading of said U.S. Pat. 2,825,721.

Other suitable copolymers, though less preferred than those alreday described herein, can be obtained by the copolymerization of ethylene and 1-butene at approximately the temperatures already described herein, in the presence of a catalyst prepared from or containing organometal compounds. Examples of such catalysts are those obtained by mixing, for example, triethylaluminum with titanium tetrachloride, a mixture of diethylaluminum monochloride and monoethylaluminum dichloride with titanium tetrachloride, a mixture obtained by admixing metallic aluminum with titanium tetrachloride, a mixture of ethylaluminum chloride with titanium tetrabutoxide, and similar catalysts, discussed in more detail in U.S. Pat. 2,846,427, issued Aug. 5, 1958, to R. A. Findlay, and U.S. Pat. 2,827,447, issued Mar. 18, 1958, to Gene Nowlin and H. D. Lyons.

Blends of said copolymers with polyisobutylene which are suitable for use in the practice of the invention are those blends containing up to 35 weight percent preferably from 1 to 35 weight percent of said polyisobutylene and from 99 to 65 weight percent of a copolymer of ethylene with one of said comonomers. One presently more preferred blend consists essentially of from 65 to 75 weight percent of a copolymer of ethylene and 1-butene, said copolymer having a density in the range of 0.946 to 0.954, preferably 0.948 to 0.952, and from 35 to 25 weight percent, respectively, of a polyisobutylene having a molecular weight in the range of 80,000 to 200,000. The preferred polyisobutylene utilized in accordance with this aspect of the invention is a normally solid polymer of isobutylene having a molecular weight in the range of 120,000 to 160,000. Examples of this type of material and the preparation thereof are discussed in U.S. Pat. 2,240,582.

The above-described preferred plastic polymer materials are superior to the commercially available low density polyethylenes which are made by what is commonly called the high pressure process, although in some instances said low density polyolefins (when essentially anti-oxidant free) are useful in the practice of the invention. Such low density high pressure polyethylenes typically have a density within the range of about 0.910 to about 0.925.

It will be noted that the layer of anti-oxident free polymer is applied to a base material which has been heated to a temperature within the range of about 450 to about 520° F. At temperatures of 425° F. and lower the bond formed between the base material and the essentially anti-oxidant free polymer is a loosely formed bond and the polymer can be readily peeled from said base material. At temperature of about 450° F. the bond formed between said base material and the essentially anti-oxidant free polymer is much more difficult to peel and is considered to be a strong bond which is suitable for many ordinary applications involving the use of polymer coated structures. At temperatures of at least 465° F. the bond formed between the base material and the essentially anti-oxidant free polymer is extremely tight and strongly adhering, and in many instances cannot be removed except by destroying the polymer as by burning or scraping because when it is attempted to remove the polymer by peeling said polymer will break. At temperatures above about 520° F. the polymer "cooks" or "chars," or is otherwise damaged and holes frequently appear in the applied polymer layer. Thus, in the practice of the invention, the temperatures employed in the preheating of the structure to be coated are within the range of 450 to about 520° F. For the strongest bonds it is preferred that the structure to be coated be heated to a temperature of at least 465° F.

FIG. 1 is a fragmentary view in cross-section, greatly enlarged, of a laminated structure of the invention wherein one layer of an essentially anti-oxidant free polymer of a 1-olefin has been applied to a base material.

FIG. 2 is a fragmentary view in cross-section, greatly enlarged, of a laminated structure of the invention wherein a primary or first layer of an essentially anti-oxidant free polymer of a 1-olefin has been applied to a base material and a second layer of an environment resistant polymer of a 1-olefin then applied to said primary layer of essentially anti-oxidant free polymer.

FIG. 3 is a schematic illustration of one method and an arrangement of apparatus for applying the various layers or coatings of polymers of a 1-olefin to a base material in accordance with the invention.

FIG. 4 is a fragmentary view in cross-section, greatly enlarged, of a laminated structure of the invention wherein a base material has been coated on both sides with a first or primary layer of essentially anti-oxidant free polymer of a 1-olefin and a second layer of an environment resistant polymer of a 1-olefin.

FIG. 5 is a schematic illustration of a modification of the method and apparatus illustrated in FIG. 3.

FIG. 6 is a schematic illustration of another modification of the method and apparatus illustrated in FIG. 3.

FIG. 7 is a fragmentary view in cross-section, greatly enlarged, of a laminated structure of the invention wherein a base material is coated on both sides with a primary or first layer of an essentially anti-oxidant free polymer of a 1-olefin, a second layer of an environment resistant polymer of a 1-olefin, and then a third layer of another environment resistant polymer of a 1-olefin.

Referring now to said drawings, wherein like reference numerals are employed to denote like elements, the invention will be more fully explained. In FIG. 1 a base material 10, here shown to be metal, is coated with a single layer 11 of essentially anti-oxidant free polymer of ethylene.

In FIG. 2 the base material 10 has been coated with a first or primary layer 11 of essentially anti-oxidant free polyethylene and a second layer of a stabilized polymer of a 1-olefin then applied to the first layer 11 of polymer.

In the method illustrated in FIG. 3, a strip or foil of sheet metal 14 is drawn from a supply reel 16, passed under a roller 18 which is mounted in the first compartment of vessel 20, through wipers 22, over roller 24, under roller 26 which is mounted in a second compartment of said vessel 20, through wipers 28, and then contacted with a stream of drying air from jets or nozzles 30. Said bath 20 is here included for illustrative purposes only. Except in special instances where the surface of the metal or other base material to be coated is especially unsuited, such as when it has been provided with a protective layer of grease or other material, the cleaning bath 20 is not necessary. For example, the first compartment of said cleaning vessel 20 can contain carbon tetrachloride, or some other suitable degreasing solvent, and the second compartment can contain a suitable aqueous solution of detergent for removing the last traces of the grease and/or carbon tetrachloride. Wipers 22 and 28 can be any suitable type of wipers such as pieces of felt or rubber mounted in suitable brackets and are employed to remove adhering liquids from the metal. The air jets 30 serve to dry the metal.

The dried metal strip, sheet or web, which can be of any suitable width and/or thickness, ranging from thin foil to sheet metal, which can be handled in the manner illustrated, is then passed over and between straightening or idling rollers 32 and through heating zone 34. Said heating zone 34 can comprise any suitable means for raising the temperature of the metal to be coated to the desired temperature. As here illustrated schematically, said heating zone 34 comprises a pair of hot plates 34 and the metal is passed therebetween. If desired, direct flame heating can be employed. It is also within the scope of the invention to employ inductive heating.

The heated metal 35 from heating zone 34 is then passed into the nip of rollers 36 and 38 which can be adjusted for the amount of compression to be exerted on said metal. As the heated metal enters the nip of said rollers 36 and 38, it is contacted with a film of essentially anti-oxidant free polymer 40 supplied from supply reel 42. Said anti-oxidant free polymer 40 passes around roller 36 into the nip of said rollers and contacts the heated metal, is partially softened by the heat retained in said metal, and compressed by the force exerted by said rollers 36 and 38. Simultaneously, a film of environment resistant polymer 44, supplied from supply reel 46, is also passed around roller 36 inside of said film of polymer 40 and into the nip of said rollers, is also softened by the heat retained in said metal 35, and is pressed against the film of anti-oxidant free polymer 40 to form a bond between said polymers, thus forming a laminated structure similar to that in FIG. 2.

After leaving rollers 36 and 38 the now coated metal passes over idler roller 48 and between two streams of quench water sprayed onto the coated metal from sprays 50. It will be understood that any suitable means for quenching the coated metal can be employed instead of the water sprays indicated. For example, the coated metal can be passed through a suitable tank containing quench water. The now quenched metal is passed over idler roller 56 and is then contacted by a stream of drying air from jets 58 and is then wound onto a take-up reel, not shown. Said take-up reel also furnishes the motive power for pulling the strip of metal through the apparatus just described.

If it is desired to simultaneously coat both sides of the strip of metal, a second film of anti-oxidant free polymer 60 supplied from supply reel 62, and a second film of environment resistant polymer 64, supplied from supply reel 66 are passed over roller 38 and applied to the underside of heated metal 35 as illustrated. FIG. 4 illustrates a laminated structure obtained from this operation.

FIG. 5 illustrates an operation similar to that illustrated in FIG. 3 except that only one side of the heated metal 35 is coated. In this embodiment of the invention, rollers 68 and 70 are refrigerated rollers and serve to quench the coated material instead of quenching with water as illustrated in FIG. 3. If desired, refrigerated air from jets 69 can also be employed as a further quench.

FIG. 6 illustrates still another embodiment of the invention similar to that illustrated in FIG. 3. In this embodiment of the invention, the heated metal 35 is passed into the nip of adjustable rollers 36 and 38. Simultaneously, a film of essentially anti-oxidant free polymer 40 supplied from supply reel 42 is also passed over roller 36 and into the nip of said rollers 36 and 38 and into contact with said heated metal. Said rollers 36 and 38 compress the polymer and a bond is formed between said metal and said polymer. Immediately after leaving rollers 36 and 38 the heated metal, now partially cooled but still retaining sufficient heat to maintain the film of polymer 40 in a softened condition, is passed into the nip of adjustable rollers 72 and 74 wherein the film of essentially anti-oxidant free polymer 40 (still in a softened state) is contacted with a film of environment resistant polymer 44 from supply reel 46' and a bond is formed between said two polymers 40 and 44. Immediately after leaving rollers 72 and 74 the new coated metal is passed between refrigerated rollers 76 and 78 for quenching. FIG. 2 also illustrates the type of structure obtained from this operation.

Although not specifically illustrated in the drawings, it will be understood by those skilled in the art in view of this disclosure that a product like that illustrated in FIG. 7 can be formed by the method illustrated in FIG. 6 simply by the addition of a third set of compression rolls and supplying an additional film of polymer over one of said third set of rolls to form a bond between the second and third layers of polymer.

The following examples will serve to further illustrate the invention.

EXAMPLE I

A 1/16-inch thick uncleaned and unpolished sheet of cold rolled steel was placed on a thermostatically controlled hot plate. When the temperature of the steel sheet reached 475° F. a 7-mil thick film of an essentially anti-oxidant free ethylene-butene-1 copolymer having about 2.5 weight percent of butene-1 incorporated in the copolymer molecule and containing 0.02 weight percent of Ionol anti-oxidant was placed on the hot metal sheet and smoothed by hand rolling with a cold metal roller. Only sufficient pressure is applied to smooth the softened polymer. The hot metal sheet and applied film, after a hot contact or residence time of about 3 to 4 seconds was immediately quenched by immersion in a water bath at room temperature (about 75° F.). Upon using a knife to pry a strip of the thus applied polymer from the metal and then pulling on the thus loosened strip of polymer, it was found that the polymer would break before loosening from the metal; thus showing that a good bond had been obtained between the metal and polymer. FIG. 1 illustrates the type of structure obtained.

EXAMPLE II

A sheet of cold rolled steel, exactly like that employed in Example I, except that the surface thereof is cleaned and polished, is coated with a polymer of the same type and in the same manner as illustrated in Example I. Upon testing the bond obtained it is observed there is very little difference, if any, in the strength of the bond obtained. This example shows that cleaning of the base material or metal is not essential so long as the metal is not coated with grease or some other such material.

EXAMPLE III

A 1/32-inch thick sheet of commercial uncleaned aluminum was placed on a hot plate as in Example I. When the temperature of the aluminum sheet reached 465° F. a 2-mil thick primary or first film of an essentially anti-oxidant free ethylene-butene-1 copolymer (as described in Example I) was applied to the hot aluminum sheet and smoothed by hand rolling with a metal roller. The hot metal and film, after a 5 seconds hot contact or residence time, was immediately quenched by immersion in water at room temperature (about 75° F.).

The thus coated metal was then reheated on the hot plate until the metal reached a temperature of 350° F. At this point the previously applied film had softened but not melted. A 12-mil thick film of environment resistant ethylene-butene-1 copolymer, the same copolymer used in said first film but also containing 0.20 weight percent Santanox anti-oxidant, was then applied to the softened layer of essentially anti-oxidant free film and rolled with the hand roller as described above. After a 5 seconds hot contact or residence time the metal and applied film layers were quenched in a water bath maintained at room temperature (about 75° F.). Upon testing the bond obtained, in the manner described above, it was found that a firm, tightly adhering bond had been obtained. FIG. 2 illustrates the type of structure obtained.

EXAMPLE IV

A 1/32-inch thick sheet of commercial uncleaned aluminum is placed on a hot plate as in Example I. When the temperature of the aluminum sheet reaches 470° F., a 7-mil. thick film of essentially anti-oxidant free polyethylene containing 0.02 weight percent of Ionol is placed on the hot metal sheet and smoothed by hand rolling with a cold metal roller. Only sufficient pressure is applied to smooth the surface of the softened polymer. The hot aluminum sheet and applied polyethylene film, after a hot contact or residence time of about 3 seconds, is immediately quenched by immersion in a water bath at room temperature (about 75° F.). Upon examination of the bond as in Example I, it is found that the polymer film will break before loosening from the metal; thus showing that a good bond has been obtained between the metal and polymer.

In the above Example III the coated aluminum sheet was quenched after the application thereto of the primary or first film of essentially anti-oxidant free polymer and before the application of the layer of environment resistant polymer. It is not necessary to thus quench the coated metal after the application of the anti-oxidant free polymer and before the application of the environment resistant polymer. The environment resistant polymer can be applied to the softened layer of anti-oxidant free polymer after it has cooled to a temperature within the range of about 275 to about 425° F. Or, if desired, the two layers of (1) anti-oxidant free polymer and (2) environment resistant polymer can be applied simultaneously. In this latter method, the anti-oxidant free polymer is, of course, placed adjacent the metal, the environment resistant polymer placed on top of said anti-oxidant free polymer, and then the two layers are rolled at the same time.

In applying the layer of environment resisting polymer, it is preferred to do so at temperatures in the lower portion of said range of 275 to 425° F., generally between 275 and 350° F. It is only necessary that said temperature be above the softening point of the essentially anti-oxidant free polymer layer.

In the above description of the invention, reference has been made to a softened polymer. In the practice of the invention, the base material to be coated is heated to a temperature which is above the melting point of the polymers used. Polymers of ethylene do not have sharply defined melting points. They usually go through a softening stage and the softening temperature is customarily defined as the temperature at which distortion of a structure fabricated from the polymer occurs. For the polymers used in the practice of the invention this temperature is usually in the neighborhood of 260° F., depending upon the load on the structure. In the practice of the invention, the hot contact time or residence time of the polymer in contact with the hot metal is only long enough to soften the polymer. Obviously, excessive contact between the film of polymer and the hot metal must be avoided because it may result in shrinkage of the film or in actual melting of the entire cross section of the polymer film, resulting in tearing or destruction of the film entirely. It is believed obvious in view of this disclosure that there is a time-temperature relationship in contacting the polymer film with the hot metal, which relationship varies with the thickness of the polymer film to be applied.

Likewise, the thickness of the base material, such as metal, must be considered, particularly in operations like those described in FIGS. 3, 5, and 6. A thick metal sheet will retain more heat than a thin foil and more layers of polymer coating can be applied to said metal without reheating the metal. For extremely thin foils it may be necessary to reheat the metal foil between successive applications of polymer film as by rolls 36 and 72 in FIG. 6. This reheating would be analogous to that illustrated in the above Example III except that no quenching would be employed after the passage through rollers 36 and 38.

It has been found that the hot contact time or residence time, i.e., the time of contact between the hot metal and the polymer, will usually vary between about 1 and about 5 seconds, depending upon the temperature of the metal, thickness of the metal, the thickness of the polymer film to be applied, etc. as described above.

Reference has been made above to an environment resistance polymer. The term "environment resistant polymer" as used herein and in the claims, unless otherwise specified, refers to a polymer of a 1-olefin (as defined herein) which contains an additive that renders said polymer particularly resistant to an environmental condition to which said polymer is to be subjected in use. Such additives are usually added to the polymers in amounts less than 0.5 percent by weight, but the amount of additive used can be as high as 2 to 3 weight percent.

For example, it is well known that polymers of 1-olefins, e.g., polymers of ethylene, are adversely affected by oxidation by air. This is a slow process depending upon the actual conditions but over a period of time should be taken into consideration. To render such polymers resistant to oxidation it is customary to incorporate therein anti-oxidants such as the Ionol and Santanox anti-oxidants referred to above.

Polymers of 1-olefins are also adversely affected by water and water vapor. This is particularly true when said polymers have been used to coat a base material as described herein because water and water vapor adversely affect the bond between the polymer and the base material. This effect of water and water vapor is also a slow process. However, if the bonded structure is to be used in an environmtnt where it will be subjected or exposed to water or water vapor, either repeatedly or over long periods of time, it is desirable to render the coated structure resistant to water and water vapor and protect the bond between the essentially anti-oxidant free polymer and base material by applying a second layer of polymer which is particularly resistant to water and/or water vapor. The above-described blends of copolymers with polyisobutylene are particularly suited for this use. One such blend which has been found particularly useful for purpose is a blend consisting essentially of from 65 to 75 weight percent of a copolymer of ethylene and 1-butene having about 2.5 weight percent of butene-1 incorporated in the copolymer molecule and a density within the range of 0.948 to 0.952 and from 35 to 25 weight percent, respectively, of a polyisobutylene having a molecular weight in the range of 120,000 to 160,000. A typical example of such a blend is one containing 70 percent copolymer and 30 percent polyisobutylene and having a density of 0.940.

If it is desired to protect the coated structure from the effect of ultra-violet light, one can use an environment resistant polymer having incorporated therein an additive such as 4-tertiary butyl phenyl salicylate; phenyl salicylate; 2,2-dihydroxy-4-octoxybenzophenone; and other substituted benzophenone, or other additives which render the polymer resistant to ultra-violet light. Carbon black in amounts of 2 to 3 weight percent has been found to be particularly effective in protecting polymers of ethylene from damage due to photo-oxidation. Thus, if desired, one can apply a first or primary layer of the essentially anti-oxidant free polymer to the base material such as metal, then apply a water resistant polymer such as described above as a second layer or lamination, and then apply a third layer of a polymer of ethylene containing one of said additives which protects against the effect of ultra-violet light. It is, of course, within the scope of the invention to incorporate more than one additive in a polymer and thus render said polymer environmental resistant toward more than one condition.

It is also within the scope of the invention to incorporate suitable rodent and/or insect repellants in the environment resistant polymers.

It is thus within the scope of the invention for the successive layers or laminations applied to the structure after the essentially antioxidant free layer to be resistant to any particular environment condition to which the coated structure is to be subjected in use. However, it should be understood that for many applications, particularly where long life of the coated structure is not critical, it is not necessary to apply a layer of environment resistant polymer.

The invention has been described above with particular reference to the application of films or sheets of polymer to sheets or webs of base materials, such as metals. However, the invention is not limited to this method of coating. Any suitable method of contacting the structure to be coated with the coating polymers can be employed in the practice of the invention.

Obviously, many structures are not adapted to be contacted with sheet polymers, for example, structures with irregular surfaces. In such instances, one can use the conventional fluidized technique. One such method involves suspending the heated structure in a chamber containing a fluidized bed of finely divided polymer. When employing this method, the heated structure is first suspended in a chamber containing a fluidized bed of essentially antioxidant free polymer and is then suspended in a chamber containing finely divided environment resistant polymer, assuming it is desired to apply an environment resistant coating.

The invention has application in the coating of many different types of structures. For example, thin coatings can be used for the protection of sheet and other forms of steel and other metals in storage and shipment from the mill. In such instances the coating will not only serve as protection against corrosion but will also serve as a die lubricant when the metal is formed. Other applications of the invention are in the corrosion protection of unitized automotive bodies, parts for appliances such as washing machines, building panels, duct works, drums, carboys and other containers, etc. Still another application is in the protection of pipe used in pipe lines where the polymer films used in accordance with the invention can be applied with conventional pipe wrapping equipment.

Another coating technique which can be employed involves cold spraying of finely divided polymer onto the heated structure which is to be coated. When employing this technique, the heated structure is sprayed first with cold, finely divided, essentially anti-oxidant free polymer and is then sprayed with the environment resistant polymer, assuming, of course, it is desired to use such a second layer. This cold spraying technique is similar to the conventional flame spraying technique except that the finely divided polymer is not sprayed through a flame and is therefore not melted as in flame spraying. The cold spraying technique has advantages over the flame spraying technique because the polymer is not melted and is thus not subjected to severe oxidation conditions.

Also while the invention has been described above with particular reference to the coating of metals, the invention is not limited thereto. The invention can be employed for applying coatings of polymers of 1-olefins to any base material such as metal, glass, cement, etc. which can be heated to the necessary minimum temperatures. The invention has been described in terms of coating metals because it is particularly applicable to the coating of metals, and metals are the base materials which are most commonly coated with polymers of 1-olefins. However, as indicated, the invention can be employed to form laminated structures comprising any suitable base material.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. A laminated structure fabricated by the steps comprising: preheating a metal structure to a temperature within the range of from 450 to 520° F.; contacting said heated metal structure with an unsoftened essentially anti-oxidant free normally solid polymer of a 1-olefin having from 2 to 4 carbon atoms per molecule and containing from 0 to not more than 0.02 weight percent of an anti-oxidant agent to deposit thereon a layer of said polymer softened by the heat in said metal structure; and thereafter cooling the resulting laminated structure.

2. A laminated structure comprising a first layer of metal, a second layer of an essentially anti-oxidant free normally solid polymer of a 1-olefin having from 2 to 4 carbon atoms per molecule and containing from 0 to not more than 0.02 weight percent of an anti-oxidant agent bonded to said metal, and a third layer of an environment resistant normally solid polymer of a 1-olefin having from 2 to 4 carbon atoms per molecule bonded to said second layer, said laminated structure being fabricated by preheating a metal structure to a temperature within the range of from 450 to 520° F., contacting said heated metal structure with an unheated essentially anti-oxidant free normally solid polymer of a 1-olefin having from 2 to 4 carbon atoms per molecule and containing from 0 to not more than 0.02 weight percent of an anti-oxidant agent to deposit thereon a first layer of said polymer softened by the heat in said metal structure, contacting said layer of polymer while in a softened state with an unheated environment resistant normally solid polymer of said 1-olefin to form a layer of said environment resistant polymer on said first layer of polymer, and thereafter cooling said metal structure with said layers of polymer thereon.

3. A method for applying a laminated coating of a normally solid polymer of a 1-olefin containing from 2 to 4 carbon atoms per molecule to sheet metal, which method comprises, in combination, the steps of: heating a web of sheet metal to a temperature within the range of 450 to 520° F.; pressing an unheated web of an essentially anti-oxidant free normally solid polymer of said 1-olefin containing from 0 to not more than 0.02 weight percent of an anti-oxidant agent onto said heated web of sheet metal for a period of time sufficient to soften at least the surface of said polymer in contact with said metal; and thereafter cooling said metal and said polymer in contact therewith to produce a tightly bonded laminated structure of said metal and said polymer.

4. A method for applying a coating of a normally solid polymer of a 1-olefin containing from 2 to 4 carbon atoms per molecule to a metal structure, which method comprises: preheating said metal structure to a temperature within the range of 450 to 520° F.; contacting said heated metal structure with an unsoftened essentially anti-oxidant free normally solid polymer of said 1-olefin containing from 0 to not more than 0.02 weight percent of an anti-oxidant agent to deposit thereon a layer of heat softened polymer; and thereafter cooling the resulting coated metal structure.

5. The method of claim 4 wherein said metal structure is preheated to a temperature of at least 465° F.

6. A method according to claim 5 wherein said polymer is a polymer of ethylene.

7. A method according to claim 6 wherein said polymer is polyethylene.

8. The method of claim 4 wherein said metal is aluminum.

9. The method of claim 4 wherein said metal is steel.

10. A method for applying a coating of a normally solid polymer of a 1-olefin containing from 2 to 4 carbon atoms per molecule to a metal structure having an essentially oxide-free surface, which method comprises: preheating said metal structure to a temperature within the range of from 450 to 520° F.; contacting said surface of said heated metal structure with an unsoftened essentially anti-oxidant free normally solid polymer of said 1-olefin containing from 0 to not more than 0.02 weight percent of an anti-oxidant agent to deposit thereon a layer of heat softened polymer; and thereafter cooling the resulting coated metal structure.

11. A method of fabricating a laminated structure, which method comprises the steps of: cleaning and polishing a metal structure to provide same with an essentially oxide-free surface; heating said surface to a temperature within the range of from 450 to 520° F.; contacting said heated surface with an unsoftened essentially anti-oxidant free normally solid polymer of a 1-olefin having from 2 to 4 carbon atoms per molecule and containing from 0 to not more than 0.02 weight percent of an anti-oxidant agent to deposit on said surface a layer of said polymer softened by the heat in said metal; and thereafter cooling the resulting laminated structure.

12. A method for applying a laminated coating of normally solid polymers of a 1-olefin containing from 2 to 4 carbon atoms per molecule to metal, which method comprises, in combination, the steps of: continuously passing a continuous web of metal through a heating zone and therein heating said metal to a temperature within the range of 450 to 520° F.; continuously passing said web of heated metal into the nip of a pair of heated rollers; simultaneously and continuously passing an unheated continuous web of an essentially anti-oxidant free normally solid polymer of said 1-olefin containing from 0 to not more than 0.02 weight percent of an anti-oxidant agent into said nip of said rollers and pressing said web of anti-oxidant free polymer into contact with one side of said heated web of metal to effect a softening of said polymer; simultaneously and continuously passing a continuous web of an environment resistant normally solid polymer of said 1-olefin into said nip of said rollers and pressing same into contact with said softened web of essentially anti-oxidant free polymer to effect a softening of said environment resistant polymer; and immediately thereafter passing said web of sheet metal, said web of essentially anti-oxidant free polymer, and said web of environment resistant polymer, in contact, as described above, through a cooling zone effective to rapidly cool said metal and said polymers to produce a tightly bonded laminated structure of said metal and said polymers.

13. A method for applying a laminated coating of normally solid polymers of a 1-olefin containing from 2 to 4 carbon atoms per molecule to a metal structure, which method comprises: preheating said metal structure to a temperature within the range of 450 to 520° F.; contacting said heated metal structure with an unsoftened essentially anti-oxidant free normally solid polymer of said 1-olefin containing from 0 to not more than 0.02 weight percent of an anti-oxidant agent to deposit on said metal structure a first layer consisting of heat softened essentially anti-oxidant free polymer; thereafter cooling said coated metal structure, contacting said coated metal structure at a temperature within the range of about 275° to about 425° F. with an environment resistant normally solid polymer of said 1-olefin to deposit thereon a second layer consisting of softened environment resistant polymer and thus form a protective coating for said first layer of polymer and its bond with said metal structure; and thereafter cooling the thus coated metal structure to a temperature below the softening point of said polymers.

14. A method according to claim 13 wherein said metal structure is heated to a temperature of at least 465° F. prior to depositing thereon said first layer of polymer.

15. A method according to claim 14 wherein said polymer is a polymer of ethylene.

16. A method according to claim 15 wherein said polymer is polyethylene.

17. The method of claim 13 wherein said metal is steel or aluminum.

18. A method for applying a laminated coating of normally solid polymers of a 1-olefin containing from 2 to 4 carbon atoms per molecule to sheet metal, which method comprises, in combination, the steps of: continuously passing a web of metal through a heating zone and therein heating said metal to a temperature within the range of 450 to 520° F.; continuously passing said web of heated metal into the nip of a pair of heated rollers; simultaneously and continuously passing an unheated continuous first web of an essentially anti-oxidant free normally solid polymer of said 1-olefin containing from 0 to not more than 0.02 weight percent of an anti-oxidant agent into said nip of said rollers and pressing said first web of anti-oxidant free polymer into contact with one side of said heated web of metal to effect a softening of said polymer; simultaneously and continuously passing a continuous first web of an environment resistant normally solid polymer of said 1-olefin into said nip of said rollers and pressing same into contact with said softened first web of anti-oxidant free polymer to effect a softening of said environment resistant polymer; simultaneously and continuously passing a continuous second web of an essentially anti-oxidant free normally solid polymer of said 1-olefin containing from 0 to not more than 0.02 weight percent of an anti-oxidant agent into said rollers and pressing said second web of anti-oxidant free polymer into contact with the other side of said heated web of metal to effect a softening of said polymer; simultaneously and continuously passing a continuous second web of an environment resistant normally solid polymer of said 1-olefin into said nip of said rollers and pressing same into contact with said softened second web of anti-oxidant free polymer to effect a softening of said environment resistant polymer; and immediately thereafter passing said web of sheet metal with said first and second webs of essentially anti-oxidant free polymer in contact therewith and said first and second webs of environment resistant polymer in contact with said first and second webs of anti-oxidant free polymer, respectively, through a cooling zone effective to rapidly cool said metal and said webs of polymers to produce a tightly bonded laminated structure of said metal and said webs of polymers.

References Cited

UNITED STATES PATENTS 2,838,437 6/1958 Busse et al. _____ 156—334 XR
2,861,022 11/1958 Lundsager _____ 161—231 XR JOHN T. GOOLKASIAN, Primary Examiner D. J. FRITSCH, Assistant Examiner U.S. Cl. X.R.

156—322, 324; 161—252